(12) United States Patent
Kwon

(10) Patent No.: US 11,467,875 B2
(45) Date of Patent: Oct. 11, 2022

(54) METHOD FOR PROVISIONING APPLICATION CONTAINER VOLUME (STORAGE) IN CLOUD PLATFORM

(71) Applicants: NAMU TECH CO., LTD., Seongnam-si (KR); ACORNSOFT CO., LTD., Seoul (KR)

(72) Inventor: Jae Hwan Kwon, Seoul (KR)

(73) Assignees: NAMU TECH CO., LTD., Seongnam-si (KR); ACORNSOFT CO., LTD., Seoul (KR)

( * ) Notice: Subject to any disclaimer, the term of this patent is extended or adjusted under 35 U.S.C. 154(b) by 0 days.

(21) Appl. No.: 17/257,508

(22) PCT Filed: Jul. 15, 2019

(86) PCT No.: PCT/KR2019/008700
§ 371 (c)(1),
(2) Date: Dec. 31, 2020

(87) PCT Pub. No.: WO2020/017846
PCT Pub. Date: Jan. 23, 2020

(65) Prior Publication Data
US 2021/0182107 A1    Jun. 17, 2021

(30) Foreign Application Priority Data

Jul. 19, 2018   (KR) ........................ 10-2018-0084022

(51) Int. Cl.
*G06F 9/50* (2006.01)
*H04L 67/1097* (2022.01)

(52) U.S. Cl.
CPC ........ *G06F 9/5016* (2013.01); *H04L 67/1097* (2013.01)

(58) Field of Classification Search
CPC .......................... G06F 9/5016; H04L 67/1097
See application file for complete search history.

(56) References Cited

U.S. PATENT DOCUMENTS

| 2007/0106714 A1* | 5/2007 | Rothbarth | ........... G06F 11/1456 |
| 2012/0179882 A1* | 7/2012 | Bernhard, III | ........ G06F 9/5022 711/156 |

(Continued)

FOREIGN PATENT DOCUMENTS

| JP | 2014-500530 A | 1/2014 |
| JP | 2014-531068 A | 11/2014 |

(Continued)

*Primary Examiner* — Chris Parry
*Assistant Examiner* — Steven C Nguyen
(74) *Attorney, Agent, or Firm* — Novick, Kim & Lee, PLLC; Jae Youn Kim

(57) ABSTRACT

Provided is a method for provisioning an application container volume (storage) in a cloud platform. The method takes provision requests and desired allocation capacity from users and provisions storage for an application container differently based on a determination of whether a cloud platform system generates a volume statically or dynamically, and based on a determination of whether the available space of storage space is sufficient or not to cover the desired allocation capacity. The method also notifies users about insufficient storage space to cover desired allocation capacity, and allows users to adjust desired allocation capacity to allow the provisioning proceed.

1 Claim, 20 Drawing Sheets

(56) References Cited

U.S. PATENT DOCUMENTS

| | | | | |
|---|---|---|---|---|
| 2013/0086351 | A1* | 4/2013 | Coronado | G06F 3/067 |
| | | | | 711/170 |
| 2016/0246626 | A1* | 8/2016 | Kolesnik | G06F 3/0631 |
| 2016/0301723 | A1* | 10/2016 | Sinclair | H04L 65/403 |
| 2017/0206020 | A1* | 7/2017 | Brown | G06F 3/067 |
| 2018/0173567 | A1* | 6/2018 | Olshefski | G06F 9/50 |
| 2020/0145346 | A1* | 5/2020 | Ra | H04L 67/10 |

FOREIGN PATENT DOCUMENTS

| | | |
|---|---|---|
| KR | 10-1807806 B1 | 12/2017 |
| KR | 10-2018-0035023 A | 4/2018 |
| KR | 10-1987668 B1 | 6/2019 |

\* cited by examiner

FIG. 11

METHOD FOR PROVISIONING APPLICATION CONTAINER VOLUME (STORAGE) IN CLOUD PLATFORM

TECHNICAL FIELD

The present invention relates to a method for provisioning a volume (storage) of an application container in a cloud platform, and more particularly, to a method for provisioning a volume (storage) of an application container in a cloud platform capable of allocating a storage space required for the application container.

BACKGROUND ART

Cloud is referred to as 'a service provider server' depending on the practices that displays a computing service provider server in a cloud shape. Only when the cloud stores software and data in a central computer connected to the Internet to access the Internet, the data may be used anytime and anywhere.

The cloud may be divided into Software as a Service (SaaS) which is an application service provided to multiple users with on-demand, such as Salesforce.com, Google e-mail, etc., Platform as a Service (PaaS) which is a software stack required for execution of developing platforms or applications such as AWS RDS, Google AppEngine, etc., and Infrastructure as a Service (IaaS) providing a server or storage to a user in a service form such as AWS EC2, according to a service providing form.

In addition, the cloud may be divided into a private cloud operated only for only one group, a public cloud rendered through an open network for public use, and a hybrid cloud as a combination of two or more clouds which have distinct identities, but are bound together, according to introducing and distributing forms.

Meanwhile, in case of an enterprise cloud, it is more important to customize and optimize a technology and an infrastructure based on an application service with a cloud implementing the business and IT strategy of a company, and it should be easy to configure or deploy the application in various infrastructures.

Accordingly, the present applicants have filed and registered the invention for a method of containerizing an application (Korean Patent Application No. 10-2017-0056483).

However, in the application, a storage space in an application container is temporary, and files in the storage space may be deleted upon restarting.

DISCLOSURE

Technical Problem

Accordingly, the present invention is derived to solve the above problems, and an object of the present invention is to provide a method for provisioning a volume (storage) of an application container in a cloud platform capable of allocating a storage space required for the application container.

However, technical objects of the present disclosure are not limited to the objects mentioned above. Unmentioned other technical objects will be apparently appreciated by those skilled in the art from the following description.

Technical Solution

According to an embodiment of the present invention, a method for provisioning an application container volume (storage) in a cloud platform, the method includes the steps of: determining whether a cloud platform system generates a static volume or a dynamic volume, if a volume allocation of an application container is requested; querying, by the cloud platform system, a static volume registration list if the static volume is generated, checking an available space if a registered static volume is selected and an allocation capacity is input, notifying that the storage space is insufficient if the available space is insufficient, waiting for a registered static volume to be re-selected and an allocation capacity to be re-input, and allocating a static volume capacity and generating information to complete the volume allocation, if the available space is not insufficient; and checking, by the cloud platform system, the available space if the dynamic volume is generated and an allocation capacity is input, notifying that the storage space is insufficient if the available space is insufficient, waiting for an allocation capacity to be re-input, and generating a storage path, allocating a capacity, and generating information to complete the volume allocation, if the available space is not insufficient.

Advantageous Effects

According to the present invention, the method for provisioning the volume (storage) of the application container in the cloud platform has an effect capable of allocating a storage space required for the application container.

DESCRIPTION OF DRAWINGS

FIGS. 6 to 11 illustrate schematically functions of a development/operation unit of FIG. 1.

MODES FOR THE INVENTION

Figure 1:
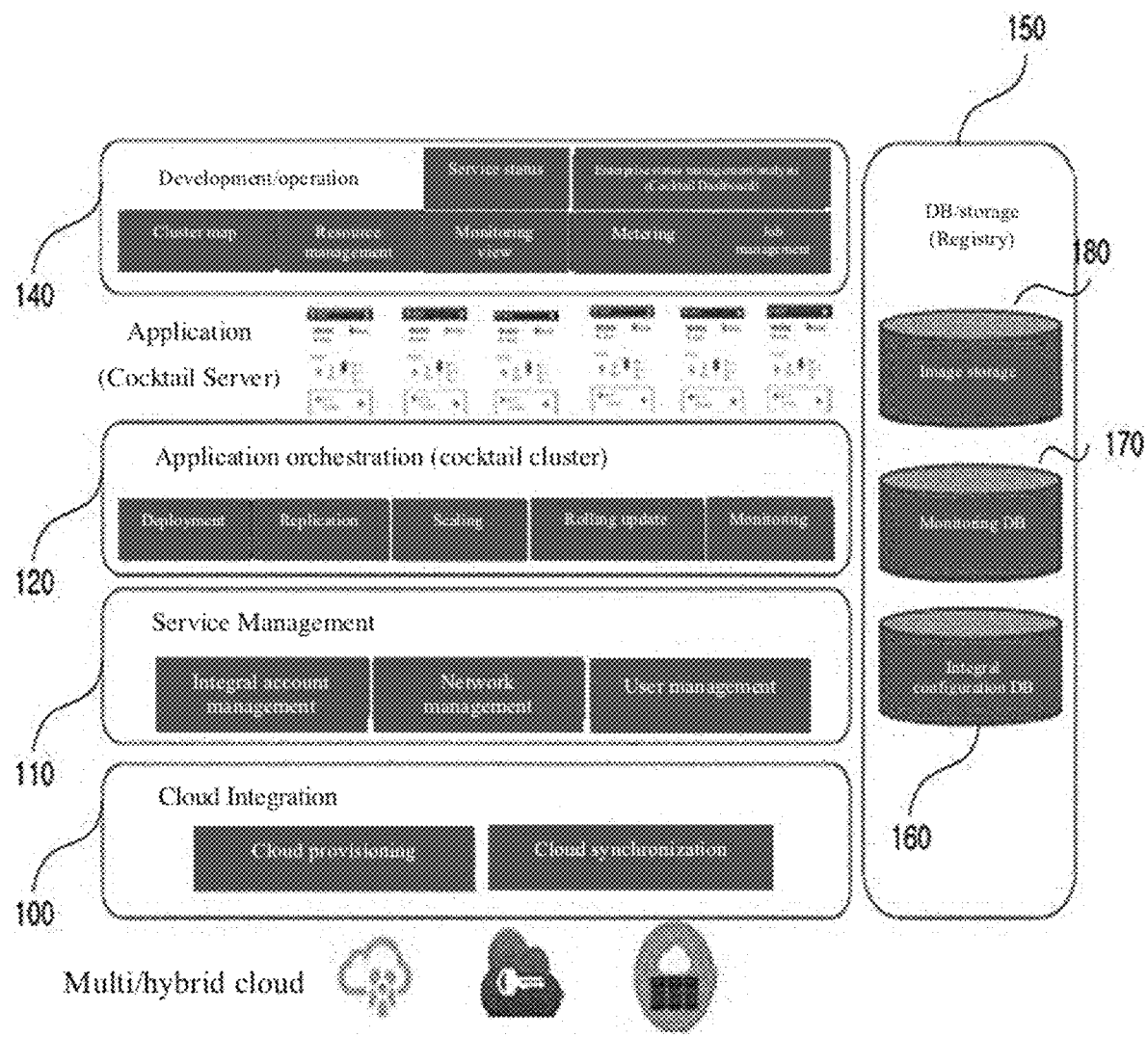
FIG. 1 illustrates a configuration diagram of a cloud platform system according to an embodiment of the present invention.

Advantages and features of the present disclosure, and methods for accomplishing the same will be more clearly understood from exemplary embodiments described in detail below with reference to the accompanying drawings. However, the present invention is not limited to the embodiments set forth below, and may be embodied in various different forms. The present embodiments are just for rendering the disclosure of the present invention complete and are set forth to provide a complete understanding of the scope of the invention to a person with ordinary skill in the technical field to which the present invention pertains, and the present invention will only be defined by the scope of the claims.

Like reference numerals refer to like elements throughout the specification.

Hereinafter, a cloud platform system according to an embodiment of the present invention will be described with reference to the accompanying drawings.

Figure 2:
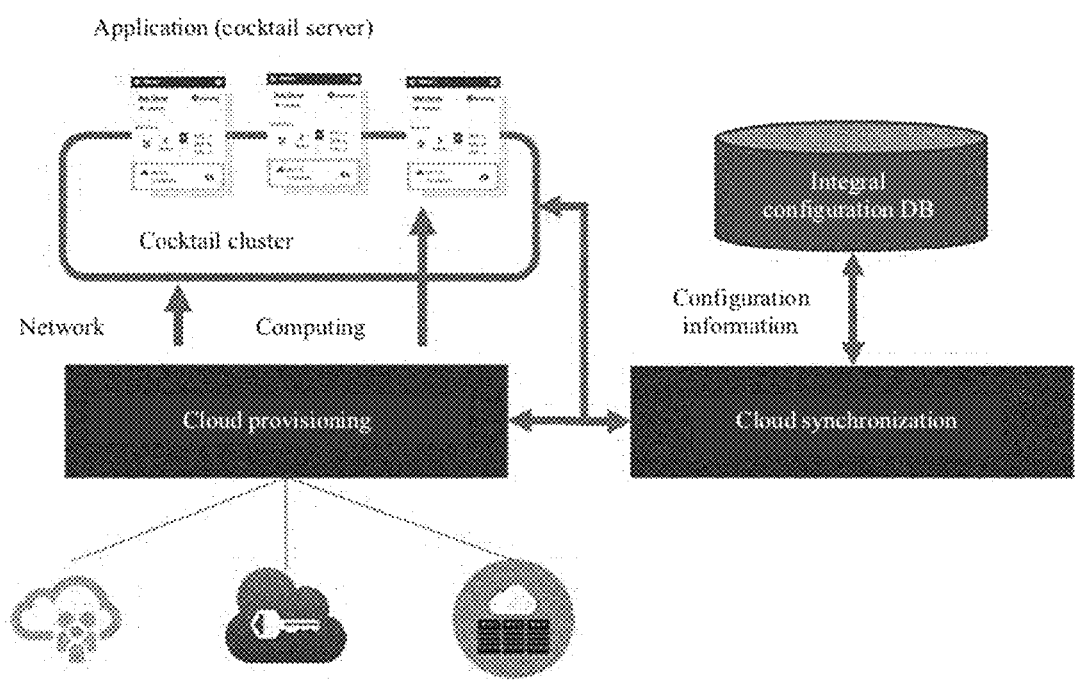
FIG. 2 illustrates schematically a function of a cloud integration unit of FIG. 1.
Figure 3:
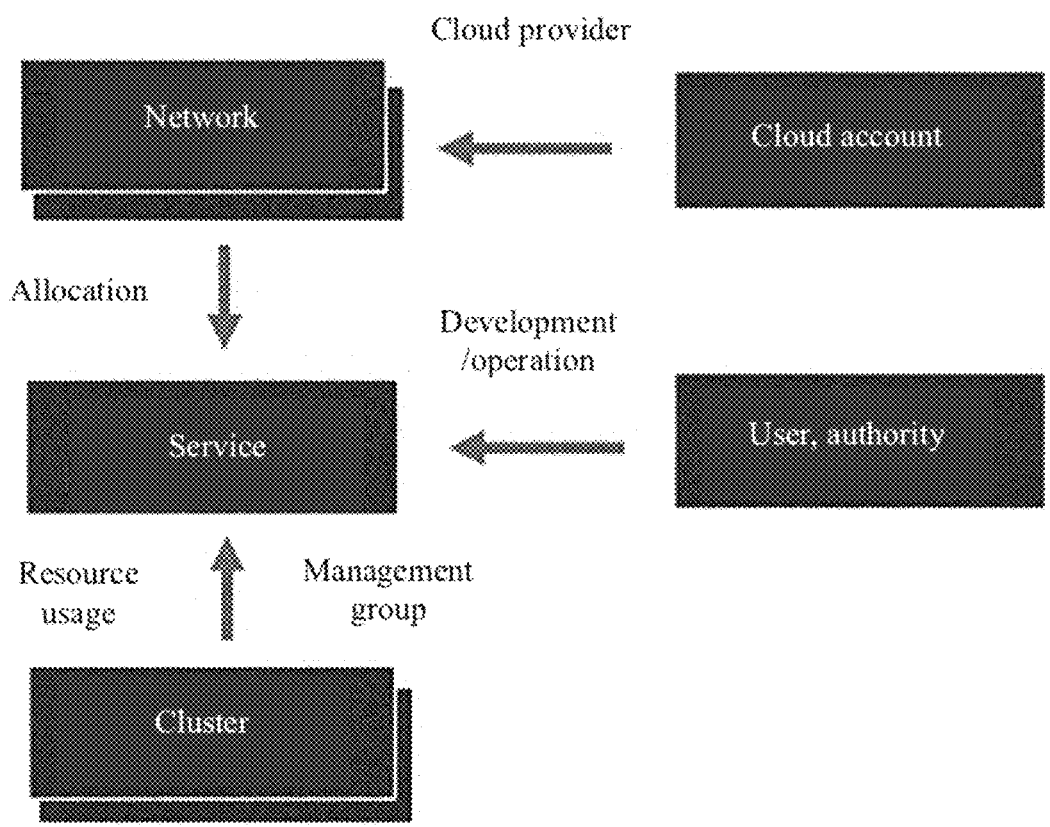
FIG. 3 illustrates schematically a function of a service management unit of FIG. 1.
Figure 4:
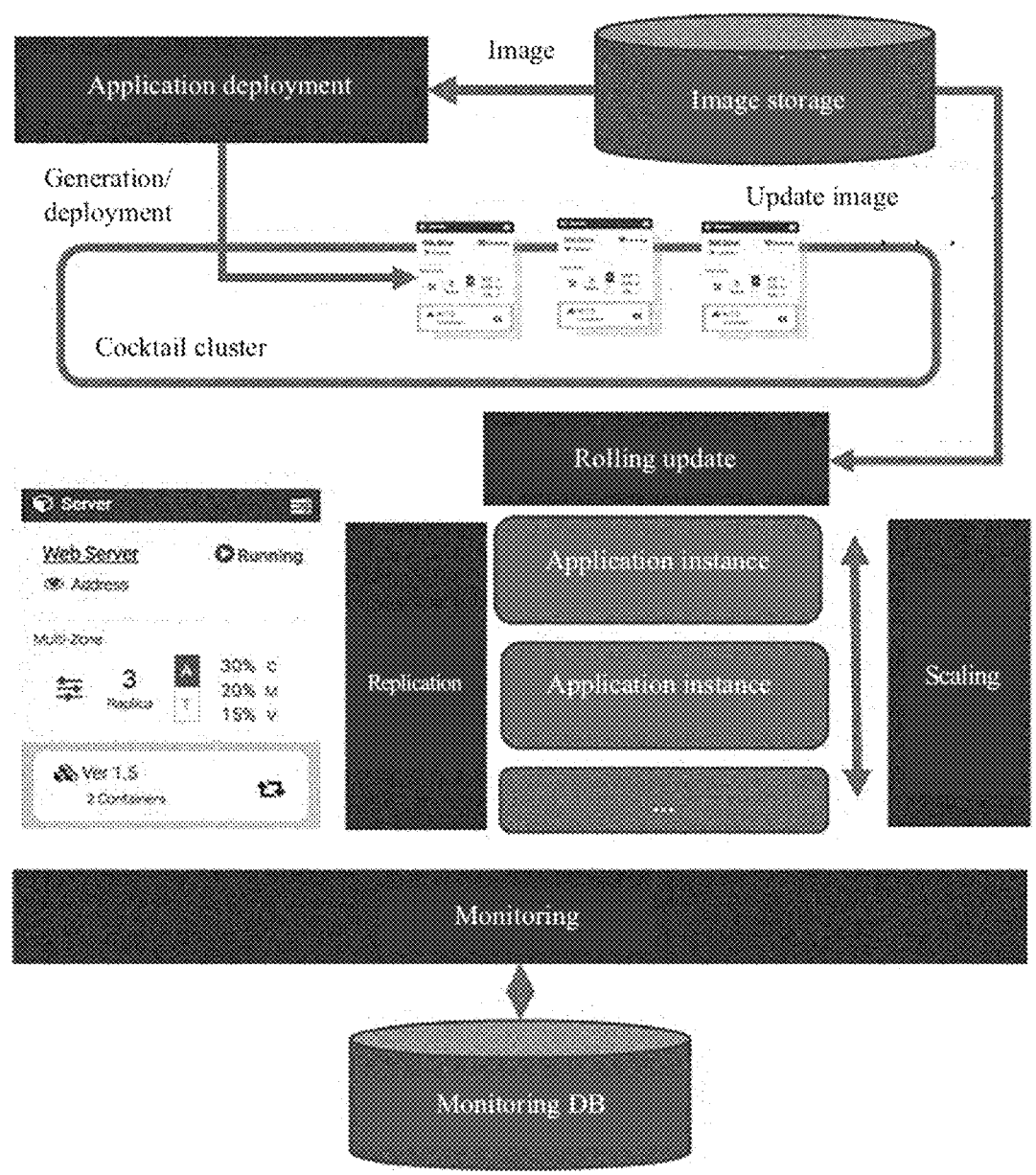
FIG. 4 illustrates schematically a function of an application orchestration unit of FIG. 1.

FIG. 1 illustrates a configuration diagram of a cloud platform system according to an embodiment of the present invention, FIG. 2 illustrates schematically a function of a cloud integration unit of FIG. 1, FIG. 3 illustrates schematically a function of a service management unit of FIG. 1, and FIG. 4 illustrates schematically a function of an application orchestration unit of FIG. 1.

Figure 5:
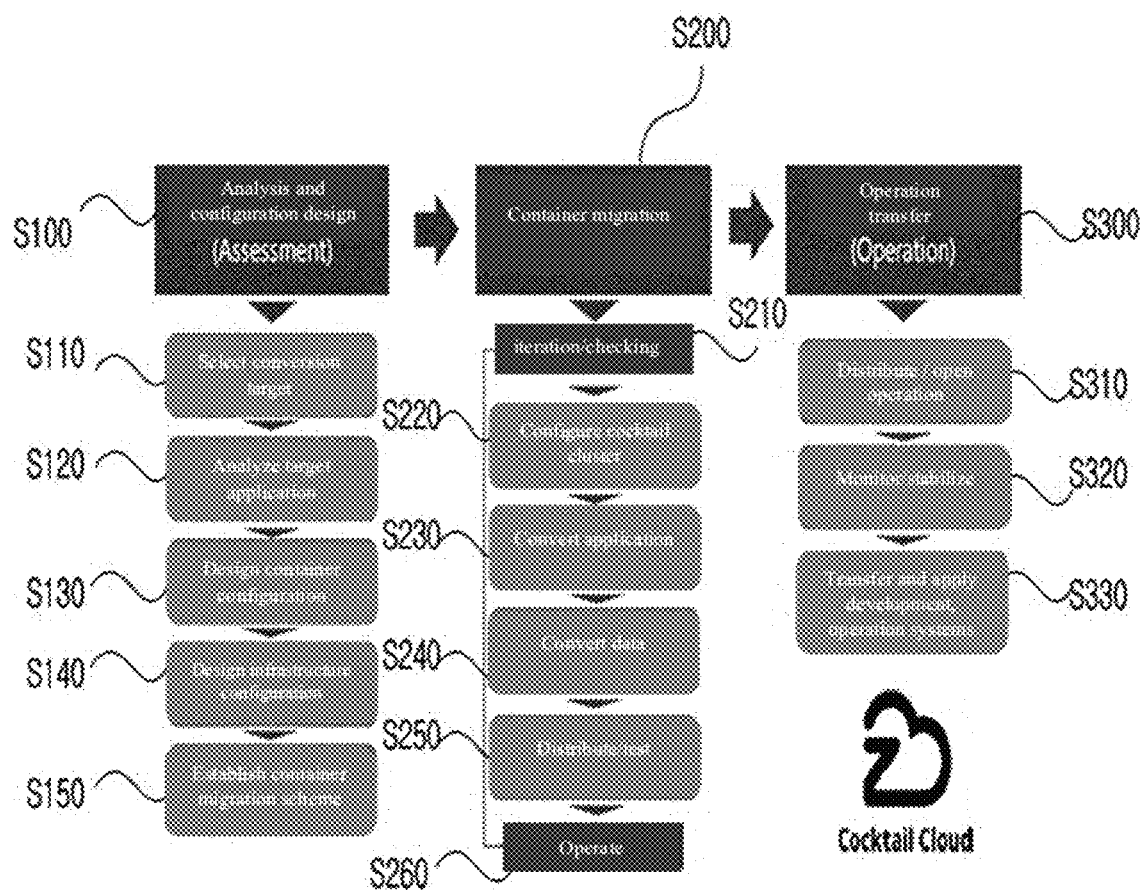
FIG. 5 illustrates a framework for application containerizing according to one embodiment of the present invention.

FIG. 5 illustrates a framework for application containerizing according to one embodiment of the present invention and FIGS. 6 to 11 illustrate schematically functions of a development/operation unit of FIG. 1.

A cloud platform system of FIG. 1 provides a view and a tool for ensuring the availability and extendability of applications and efficienating development and operation based on integration management of a multi/hybrid cloud. Hereinafter, a cloud platform system of the present invention is referred to as a "cocktail cloud".

Referring to FIG. 1, a cocktail cloud includes a cloud integration unit 100, a service management unit 110, an application orchestration unit 120, a development/operation unit 140 (DevOps View), and a DB/storage 150.

The cloud integration unit 100 serves to automatically configure an infrastructure of a multi/hybrid cloud to provide the configured infrastructure to an application and synchronize configuration information for management.

The cloud integration unit 100 performs cloud provisioning and cloud synchronization functions.

Referring to FIG. 2, the cloud provisioning function is a function of configuring and providing a cloud network infrastructure to an application cluster (cocktail cluster) and configuring and providing a computing infrastructure of the cloud to the application. In addition, a physical infrastructure (Bare Metal) provides a cluster configuration tool. A support cloud may include AWS.Azure.Aliyun.Google Computing Engine for Public, Openstack.VMWear for private, and On-premise.Datacenter BareMetal Infra.

The cloud synchronization function is a function of storing and managing cloud infrastructure configuration information in an integral configuration DB 160 and synchronizing infrastructure change information with the integral configuration DB 160 when operating.

The service management unit 110 serves to allocate and manage a cloud account and a user and a network resource to a logic group of managing an application cluster. That is, the service management unit 110 performs an integrated account management function, a network management function, and a user management function.

Referring to FIG. 3, the integrated account management (Cloud Provider) function is a function of integrally managing a multi-cloud account and access information and being used for a network and a cloud providing function.

The network management function is a function of configuring a cloud network and allocating the configured cloud network to a service. For example, the cocktail server may be VPC•Subnet of AWS. One service generates a cluster using a network of a provider of a multi-cloud to configure and operate the application.

The user management function is a function of managing team members managing services and authority required for development/operation. Here, the authority may include enterprise service management authority (Admin), enterprise service injury authority (Manager), service management authority (DevOps) allocated to members, etc. The user may participate as a member on several services.

The application orchestration unit 120 plays a key function of a cocktail cluster as a function of ensuring the deployment, availability, and extendability of applications.

The application orchestration unit 120 performs an application deployment function, a replication control function, a rolling update function, a scaling function, and a monitoring function.

Referring to FIG. 4, the application deployment function is a function of providing easiness without requiring a separate setting and a configuration operation with container image-based deployment and automatically provisioning a cloud infrastructure upon the application deployment.

Here, the application is to be containerized and deployed, and the application container (hereinafter, referred to as a "container") means an independent system on the OS which allocates, isolates, and visualizes host resources in an application process.

The core technology used in the container is a control group (cgroup) and a namespace of Linux. The cgroup makes a corresponding process group and performs allocation and management of resources in order to allocate the host resource to the process on the OS. The namespace is a technique to isolate a process, a network, and a mount to a specific name space. Accordingly, the container means an independent system which allocates resources to the application process via the cgroup and is virtualized on the OS isolated by the namespace.

The container is a technique suitable for application virtualization which has almost no consumption of host resources and a very small time required for starting as a light OS visualization method without using a hypervisor (hardware emulator) and a guest OS. Further, the container can be independently configured and deployed to an infrastructure such as a physical server (Bare Metal) and a virtual server (Virtual Machine) by virtualization on the OS.

To convert the existing or new application configuration to a container, a containerization process should be involved. In addition, the conversion of development, testing, and operation methods should be parallel with a process of optimizing an operation infrastructure configuration (cocktails cloud platform).

In order to convert the existing application to the container, the settings of the application and the conversion of a configuration rather than the source are required. Considering deployment and operation efficiency, a role-specific independent configuration based on a workload is general and a configuration considering multiplexing and scaling through the replication needs to be designed and applied.

For conversion of development, testing, and operation of the application, an application configuration needs to be standardized by building, testing, and deployment of an image-based application, and a base image.

In order to optimize the operation infrastructure configuration of the application container, a cluster-based infrastructure for a container orchestration is configured, a computing capacity considering replication and scaling needs to be calculated (minimizing a spare capacity, and easiness of expansion as necessary), and related infrastructures such as share, storage, security, and a network need to be configured.

Referring to FIG. 5, containerization is divided into analysis and configuration design (S100), container conversion (S200), and operating transfer (S300).

A container conversion target is selected from existing applications by considering container/cloud introducing purposes and strategies for the analysis and configuration design (S100) (S110).

When the target application is selected, the target application is analyzed (S120). At this time, an application status and data such as applications, infrastructures, data, applications and associated structures are examined, and the needs of development and operation managers are collected. In addition, a container configuration direction, issues and solutions are derived.

In addition, considering the separation/integration, association, availability, extendibility, security, etc., a target application-specific container configuration is designed (S130). At this time, an image build template such as a base image, environment variables, including items, and commands may be defined.

Then, an infrastructure configuration is designed (S140). A conversion infrastructure (Cloud/Bare Metal) provider is selected, and a capacity for each application container is selected. In addition, the number of container cluster nodes and an infrastructure capacity are calculated and storage, network and security configurations are designed.

When the infrastructure configuration is designed, a container conversion scheme is established (S150). At this time, a detailed conversion scheme for each application is established, the conversion work and organization/role are defined, and a conversion schedule is established. In addition, reporting and feedback are reflected.

An iterative/incremental conversion (S210) is required for the container conversion (S200). A pre-test (PoC), an application-specific graded conversion, etc. are iteratively and incrementally converted.

In order to configure the cocktail cluster (S220), a cocktail cloud platform is installed and configured, and an infrastructure such as a network, a shared storage, and security is configured (provisioning in the cocktail in the case of the cloud). A cocktail service and a cluster are generated by allocation of the infrastructure and user registration and a cluster configuration is verified.

In addition, for application conversion (S230), an application container is configured and application settings and source are changed if necessary. The functions and settings of the conversion container are verified and registered in a container deployment image build and registry. A cocktail server is generated and tested.

For data conversion (S240), a target application container is converted, a cocktail server is configured by a persistence volume setting and the like, and data is extracted and transmitted to the cocktail server. If the DB solution is applied, data conversion is performed and data integrity is checked. In the case of the operation application, in order to minimize a downtime, a data synchronization solution is applied.

Thereafter, the verified container is deployed to the cocktail server, an application function and a performance test are performed, and the testing result is reflected to the container and the infrastructure (S250 and S260).

For operation transfer (S300), operation deployment/open (S310) is performed, and specifically, an operation cocktail cluster is generated and a cocktail server is generated based a conversion-completed image to be associated and configured. In addition, operation data is transferred and an application is opened. A technique of deploying, operating, and managing the application container is referred to as a container orchestration.

The container orchestration is a technique of deploying, operating, and managing the application container by configuring a managed cluster in a physical/virtual infrastructure, and has been cloudified in the existing offices and the data center infrastructures and spread into an application management platform of the private/public cloud by using advantages of light and fast starting and mobility of the container.

The operation monitoring of the application and the infrastructure is performed by the cocktail cloud monitoring view and performance issues and errors are reflected (S320).

For development/operating system transfer and application (S330), the container transfer result is reported, a container-based development/operation system training is conducted in an organization responsible for the development and operation, and a cocktail cloud platform usage training is conducted.

Accordingly, the container has the following advantages.

First, the container has the independence.

The container is an isolated application execution environment, independent resources are allocated (CPU, Memory, Disk, Network, etc.), and multiple applications are operated on the same host.

Second, the container implements a light virtualization.

The container enables an OS-level virtualization (Non Hypervisor), allows fast handling (generation, execution, restarting, etc.), and enables efficient deployment and updating with a small size of container image.

Third, the container has mobility.

The container has an infrastructure independent image, is movable anywhere such as a Bare Metal, a virtual machine, and a cloud, enables online deployment and version management by an image registry, and supports a main host OS (Linux series, Windows). The mobility of the container enhances productivity and efficiency of the application operation/development under a multi/hybrid cloud environment, and specifically, solves the difficulty in application deployment and transfer in a heterogeneous infrastructure with a standardized container image and solves a lock-in problem dependent on a specific cloud.

The replication function is faster and more efficient than OS rebooting as a method of maintaining a specified initial replication number (multiplexing) for the stability and availability of the application and restarting when an error occurs through an application container health check. The replicated application is serviced through load balancing.

The rolling update function is a function of performing an update operation such as deployment and infrastructure change without stopping the application service and configuring automation through a job management function of DevOps View when there is dependency between multiple applications.

The scaling function is a function of in/out scaling of an instance through the monitoring of the application and up/down scaling of a resource capacity in the case of the application infrastructure. In addition, scaling automation is configured through monitoring information.

The monitoring function is a function of monitoring an application instance (container+infrastructure), and generating and managing an alarm through a threshold setting.

The development/operation unit (DevOps View) 140 includes a service status function, a cluster map function, a monitoring view function, a resource management function, a metering function, a job management function, and an enterprise status management/analysis function. The respective functions will be described below with reference to FIGS. 6 to 11.

Figure 6:

The service status function provides a view that may determine a status of all application clusters of the cocktail cloud based on the service (see FIG. 6). Then, items of a service status, a cluster status, a monitoring alarm, etc. may be displayed.

In the service status, it is possible to query the entire service status of the cocktail cloud and determine a cloud provider, a cluster, a server, a cloud component, current monthly using cost, etc. by synthesizing a configuration status of the cluster in the service. Here, the cluster means a configuration unit of the application and the service means a logical group of the cluster.

In the cluster status, a provider, a region, a server, a cloud component, and monthly using cost can be queried in a card form, and in the physical (Bare Metal) cluster, the using cost may be excluded.

In the monitoring alarm display function, when an alarm occurs in the application and the infrastructure of the cluster, the cluster status may be checked in a cluster card.

Figure 7:
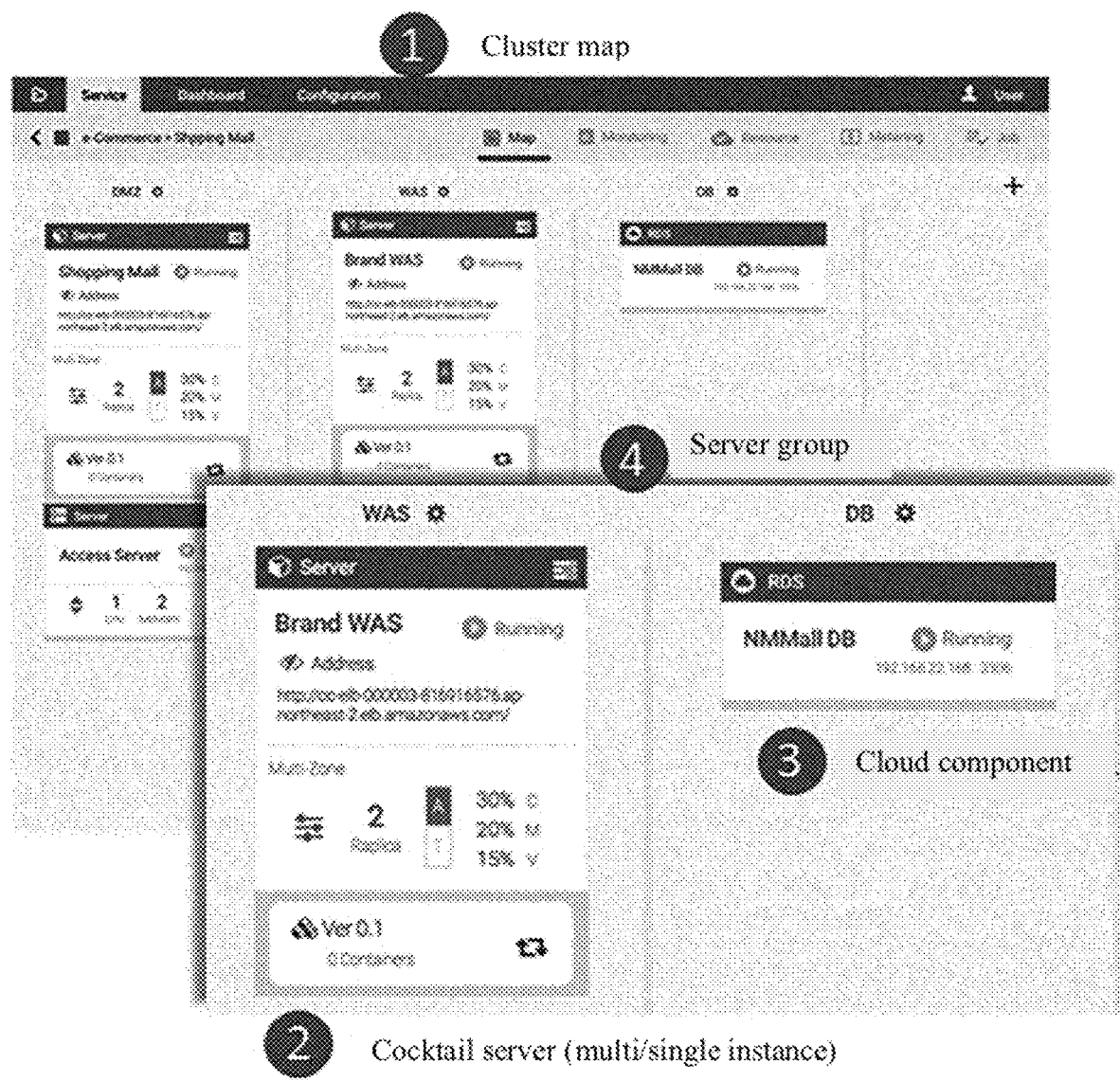

The cluster map function provides a view capable of visualizing and managing a configuration and status information of the cocktail server (application) in a map form (see FIG. 7).

The cluster map queries/manages a configuration of a server of the cluster and a cloud component in a map form to enhance visibility of the configuration information. The cluster map may include items such as a cocktail server, a cloud component, and a server group.

The cocktail server is configured by a load balancing, an application container, and an infrastructure as a basic unit of the application orchestration, and provides an interface standardized for multi/hybrid cloud management. The cocktail server verifies an application status and replication, and a resource usage in the server and manages scaling, rolling update, etc. The cocktail server is divided into multi and single instance types according to presence or absence of a replication function. In AWS, a multi-zone option is supported.

The cloud component manages PaaS services provided by a provider. For example, the cloud component may be RDS as a DB service of AWS.

A server group provides a logical group of a server configuration to management convenience.

Figure 8:
Figure 9:
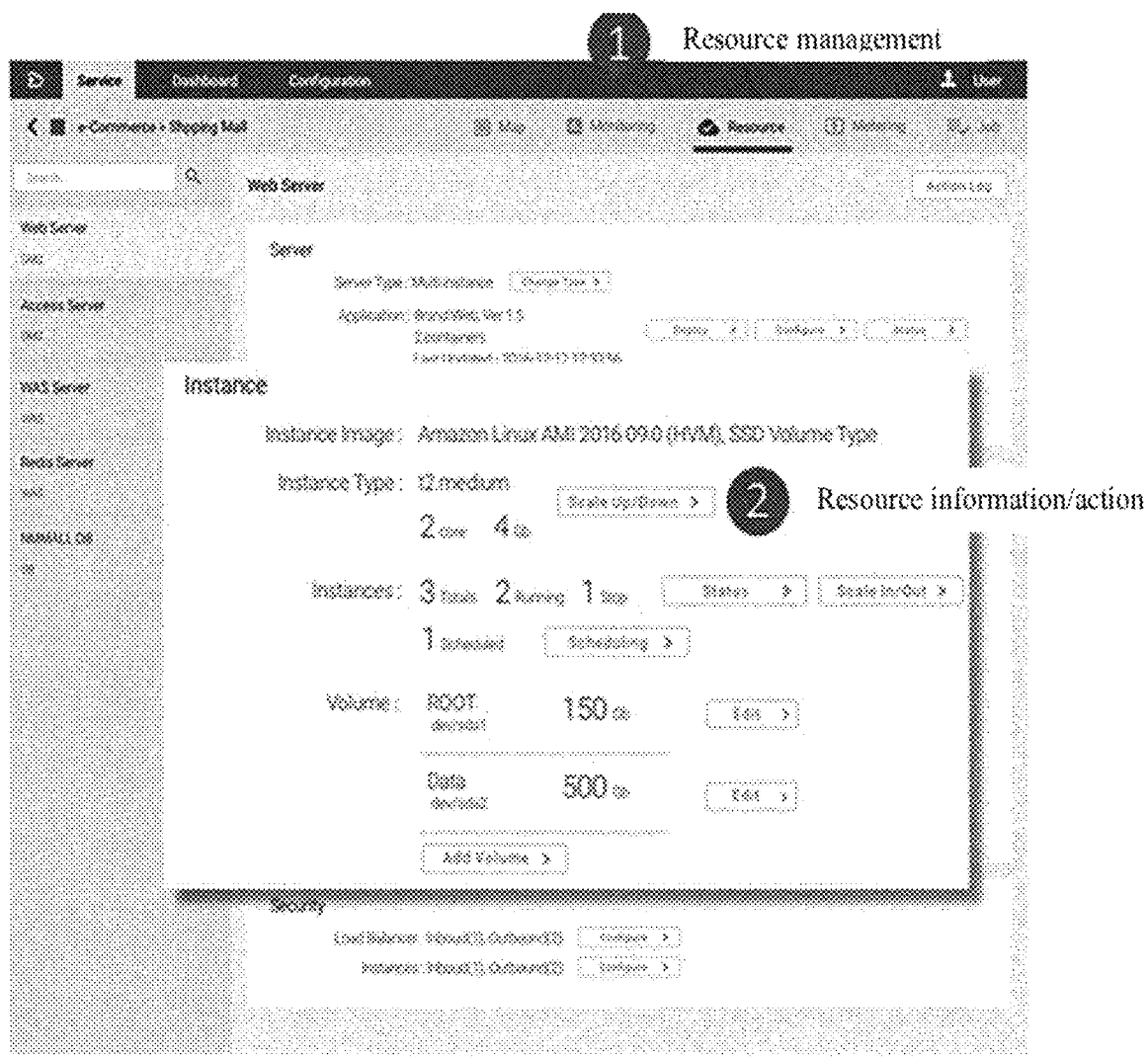
Figure 10:

The monitoring view function provides information capable of verifying resource capacity and status of the application and the infrastructure in the cluster and verifying a status of a cloud resource (see FIG. 8).

The monitoring view visualizes and provides the monitoring information on the application and infrastructure in the cluster and checks a usage of resources by providing a CPU, a memory, an average of the disk, and TOP information to correspond to operation.

The monitoring view may include a view conversion (trend/data) item, a target conversion (server/resource), etc.

In view conversion item, a trend view provides monitoring information for each time for the server, the replicated instance, and the application container and the data view provides an average of the current time, and a TOP monitoring value.

In the target conversion item, a monitoring target is divided into a server in the cluster and a resource of the cloud infrastructure. The cloud resource uses information provided by the supplier.

The resource management function checks a resource of the cloud infrastructure configuring the application and provides a view (hereinafter, referred to as a "resource management view") capable of adjusting detailed settings if necessary.

The resource management view may check a cloud infrastructure resource configuring the cocktail server and change settings specifically. Here, the cocktail server automatically performs a basic configuration for the application orchestration, but is used when there is a need for adjusting a cloud resource directly if necessary.

The resource management view includes a resource information/action item and the application of the resource information manages container configuration and deployment information. The cloud resource information consists of a load balancer, an instance (VM), and security, and the instance manages a capacity and a volume. Resource information required for adjustment is performed through an action.

The metering function provides a view (hereinafter, referred as a "metering view") capable of checking cost information of the cloud infrastructure resource used for the application. The metering view may include a cluster infrastructure use cost item, a server, a cost item for each resource, and the like.

In the cluster infrastructure use cost item, the cluster and the cocktail server may check a cost status of the using cloud resource and provide previous month and current month cost information, and next month estimation cost. Further, a cost increase and decrease trend graph is provided for each month.

Cost items for each server and each resource provide cloud resource cost used for each cocktail server based on TOP and provide cost used for cloud resource type based on TOP.

Figure 11:
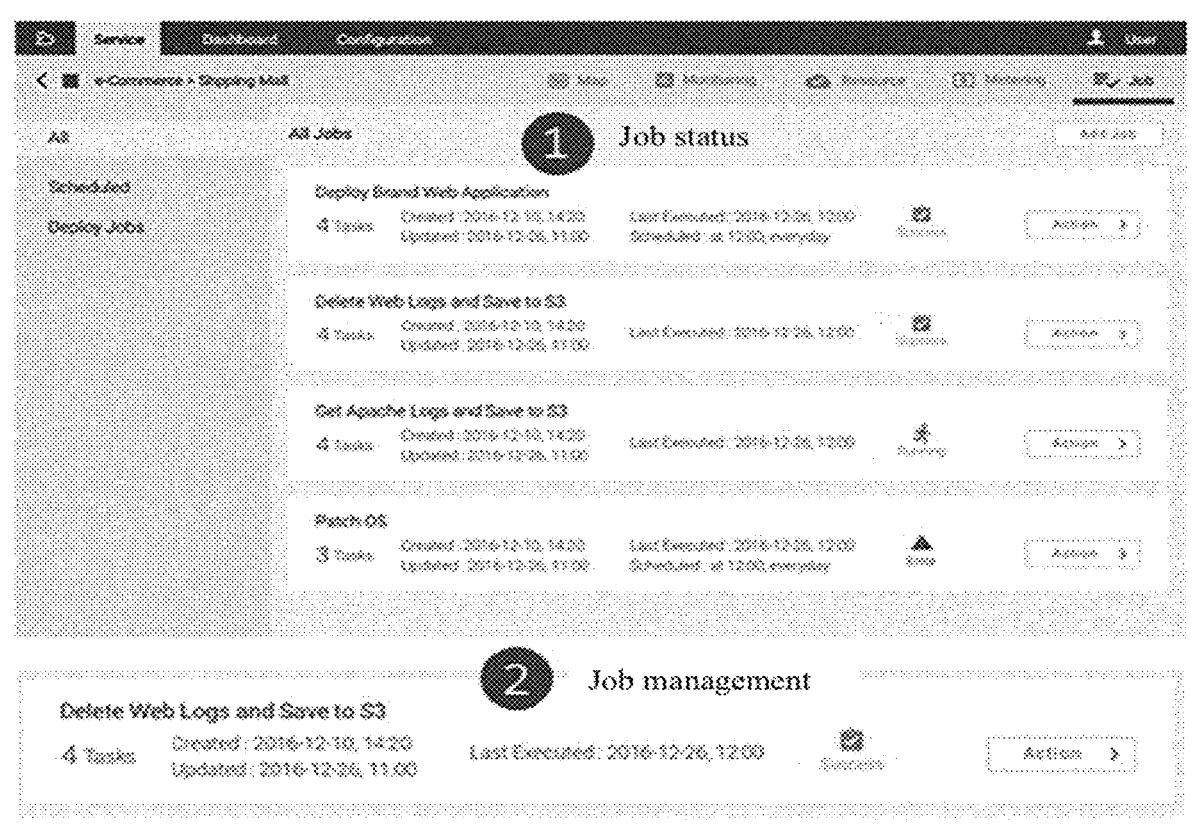

The operation management function provides a management view (hereinafter referred to as an "operation management view") capable of scheduling/automating an operation such as deployment, a remote command, and resource management (see FIG. 11).

The operation management view provides scheduling and batch-processing for operating the applications and the infrastructure. The operation management view may include a job status item, a job management item, etc.

In the job management view, the job status item is divided into deployment, a remote command, and a resource management task and configured by combining respective tasks. Here, the deployment refers to application deployment, the remote command means performing an OS command in remote, and the resource management means scaling, and a status/setting change.

In the job management view, the job management item may set a performing method according to immediately performing, scheduling, and occurrence of the alarm. The performance according to the occurrence of the alarm is used in automatic scaling according to a reference value of the capacity monitoring. In the job management item, an execution state and a log check of the job are provided.

The enterprise status management/analysis function provides a cocktail dashboard capable of determining and analyzing an enterprise application, a cloud, and a cost situation.

The cocktail dashboard is a view of querying a status of the application and the cloud infrastructure in the enterprise level and providing cost/budget management, cost optimization analysis, and statistics reports. The cocktail dashboard may include an application status item, a cloud status item, a cost/budget management item, a cost optimization analysis item, and a statistics/report item.

It is possible to enterprisely determine and query application and infrastructure statuses based on standardized elements of the cocktail server, the cluster, and the cloud component through the application status item and provide a status view based on the service.

The cloud status item may determine a status of a cloud used for the enterprise for each provider, each region, and each resource and provides an infrastructure-based status.

The cost/budget management and cost optimization analysis items determine an enterprise cloud cost situation and provide information capable of efficienating cloud resource cost by budget allocation/control and optimized analysis for each service.

The statistics/report item provides statistical information and a report view required for analysis and reporting.

In the DB/storage 150, an image storage (registry) 180 manages registration, share, download, search, version of the application container, a monitoring DB 170 manages monitoring information of the application and the infrastructure, and an integral configuration DB (configuration management DB, CMDB) 160 manages configuration information of a provider, a network, a service, a cluster, a server, a component, and a cloud resource.

Figure 12:
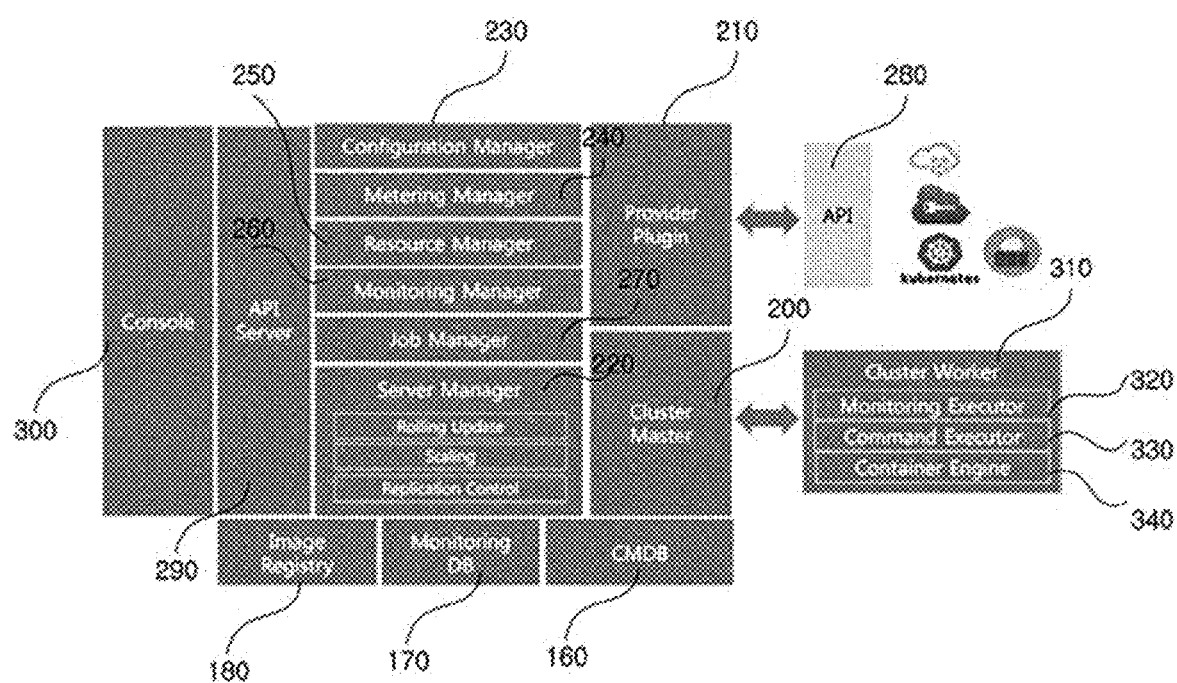
FIG. 12 illustrates an architecture of a cloud platform system according to an embodiment of the present invention.
Figure 13:
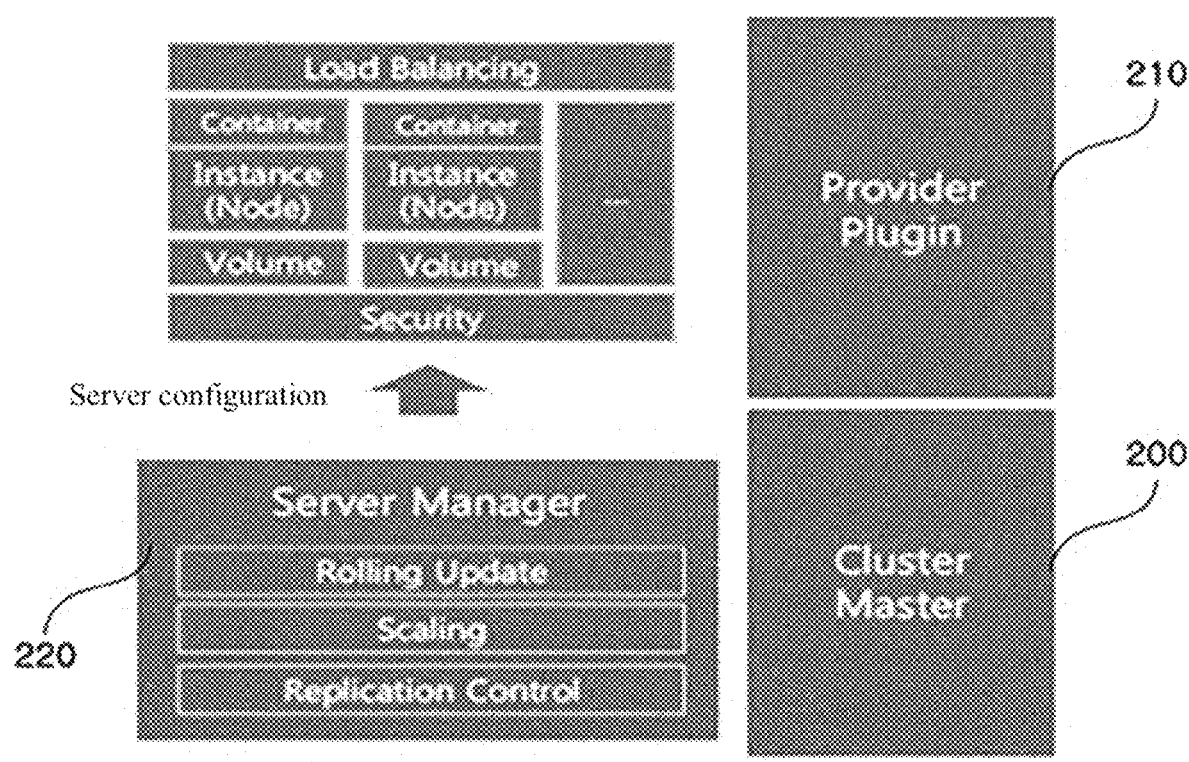
FIG. 13 illustrates a configuration of a cocktail server and surrounding architectures thereof.

FIG. 12 illustrates an architecture of a cloud platform according to an embodiment of the present invention, and FIG. 13 illustrates a configuration of a cocktail server and surrounding architectures thereof.

Referring to FIG. 12, a cocktail cloud includes a cocktail cluster 200, a provider plug-in 210, a server manager, 220, a DevOps manager, a CMDB 160, a monitoring DB 170, an image registry 180, an API server 290, and a user console 300.

The cocktail cluster 200 provides an orchestration-based architecture and the provider plug-in 210 is used as a basic module for integral management by a cloud provider API 280.

The cluster 200 is constituted by a node and a master and the node is a structure of processing a command of the master by a worker 310. The worker 310 is responsible for communication with the master and an executor is supported by an execution command. A monitoring executor 320 collects node and container monitoring information and a command executor 330 performs an OS and a container command. In addition, a container engine (docker) 340 is included.

The provider plug-in 210 is an API rapper for supporting Kubernetes API for a multi-cloud and Bare Metal and is configured by a plug-in module for provider extension. The cocktail server is a basic unit of the application orchestration and performs replication, scaling, and rolling update of the container and the cloud infrastructure by the cluster master 200 and the provider plug-in 210.

The cocktail server is constituted by a container and a cloud infrastructure as illustrated in FIG. 13, and constituted by a load balancer, an instance (node), a container, a volume, and security, and may be, for example, ELB, EC2 Instance, Security Group, and ESB of AWS. The cocktail server provides a cloud component for PaaS of the cloud provider. For example, the cocktail server may be RDS of AWS.

The server manager 220 is a control module of performing orchestration of an application container and an infrastructure in the server, and provides a replication control to restart/recover a container abnormally terminated, scaling of performing scale in/out and up/down through an instance type and a volume extension, and a rolling update function of performing non-disruptively an application container deployment sequentially.

The DevOps manager, as a manager module of DevOps, provides a configuration manager 230 for provisioning a multi-cloud infrastructure, a metering manager 240 for managing a usage and cost of a multi-cloud resource, a resource manager 250 for managing a resource status and settings of the multi-cloud, a monitoring manager 260 for collecting and managing container/infrastructure monitoring information, and a job manager 270 for a task of deployment, a server action, and a remote command in which various job tasks are combined and integrally performed and immediate performance, a performance time, and event occurrence are performance conditions.

The cocktail cloud provides a DB for managing configuration information of an application and an infrastructure, monitoring information, and an application container image and provides a user and an interface for programming.

The CMDB 160 manages configuration information of a provider, a network, a service, a cluster, a server, a component, and a cloud resource.

The monitoring DB 170 manages monitoring information of the application and the infrastructure.

The image registry 180 manages registration, share, download, search, version of the application container.

The API server 290 provides all functions of the cocktail cloud to the API 280 and supports customization according to a corporate strategy and association with other solutions.

The user console 300 is provided in a form of Web GUI.

The cocktail cloud may be used as follows.

First, the cocktail cloud may be used as a multi-cloud.

The cocktail cloud is a platform for integral management of a heterogeneous and complex multi-cloud environment by a standardized component and implements the entire business cloud quantity based on the application. Specifically, the cocktail cloud is a standardized management component for standardizing a managing target by the provider, the network, the service, the cluster, the server, and the cloud component and integrally managing a heterogeneous and complex multi-cloud resource (integral account, resource, and cost). Further, the application is a core resource of the business, and the availability and extendability of the application are enhanced by the cocktail cluster and a development/operation work is efficienated by the cocktail DevOps View, thereby implementing a business cloud based on the application.

Second, the cocktail cloud provides an infrastructure of construction/operation of a hybrid cloud by cloudifying Bare Metal infrastructure within an office and a data center. The cocktail cloud also provides integral management and development/operation efficiency of a hybrid complex infrastructure.

Specifically, the application cluster is configured in the Bare Metal infrastructure in the office and the data center to construct a container-based cloud environment, so that a separate platform for virtualization is not required, availability and extendability of scaling, etc., are provided, and a cloudifying of a physical infrastructure capable of integrally managing existing private and public clouds may be implemented.

Also, the cocktail cloud is managed by a standard component of the cocktail cloud and provides development/operation task efficiency by the cocktail cloud DevOps view.

Third, the cocktail cloud provides a platform for efficient management of the application on the cloud and constructing and operating a micro service through automation for the container and CI/CD.

The cocktail cluster provides an application deployment and management environment (cloud-native application) in a cloud infrastructure based on the container. Here, the cocktail cluster is a basic unit of constructing and managing the micro service.

Job management of the cocktail DevOps view provides an automated infrastructure capable of building and deploying the application and the container may be lighter and easier to perform the CI/CD. The cocktail cloud provides a platform that may deploy/operate applications on a multi/hybrid cloud.

Fourth, the cloud cocktail may be used also as an infrastructure resale and service providing platform of a cloud service broker.

The cloud cocktail constructs and operates a CSB platform which manages integrally a public cloud and a data center infrastructure and provides a resale and cloud management platform to a user in a service form, provides a multi-tenancy and billing system for SaaS, and can be used as a platform for providing and managing affiliate clouds in the case of large-scale enterprises.

Also, the cloud cocktail cloudified and provides an infrastructure of an existing data center provider and provides a service (cocktail cloud component (PaaS)) specified to a public cloud provider.

Meanwhile, there is a problem that the storage space in the container is temporary, and files in the storage space are deleted upon restarting. Due to this problem, the cloud platform system provides a container volume (storage) provisioning function that logically connects and uses an external storage space and a container using a volume object.

Figure 14:
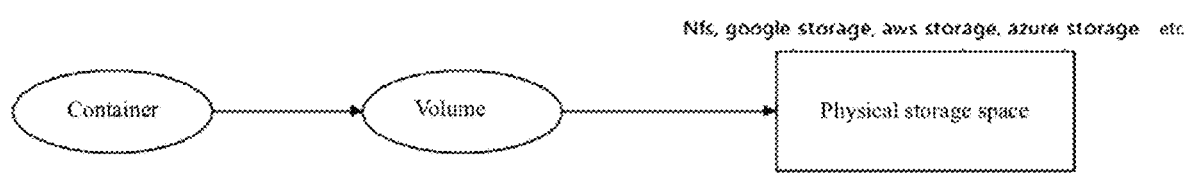
FIG. 14 is a schematic diagram of a container volume (storage) according to an embodiment of the present invention.

The container volume (storage) provisioning function of the present invention is a function of generating volume information in various storage storages (nfs, cloud storage, etc.) on a GUI and allocating and managing a storage space required for the container (see FIG. 14).

Figure 15:
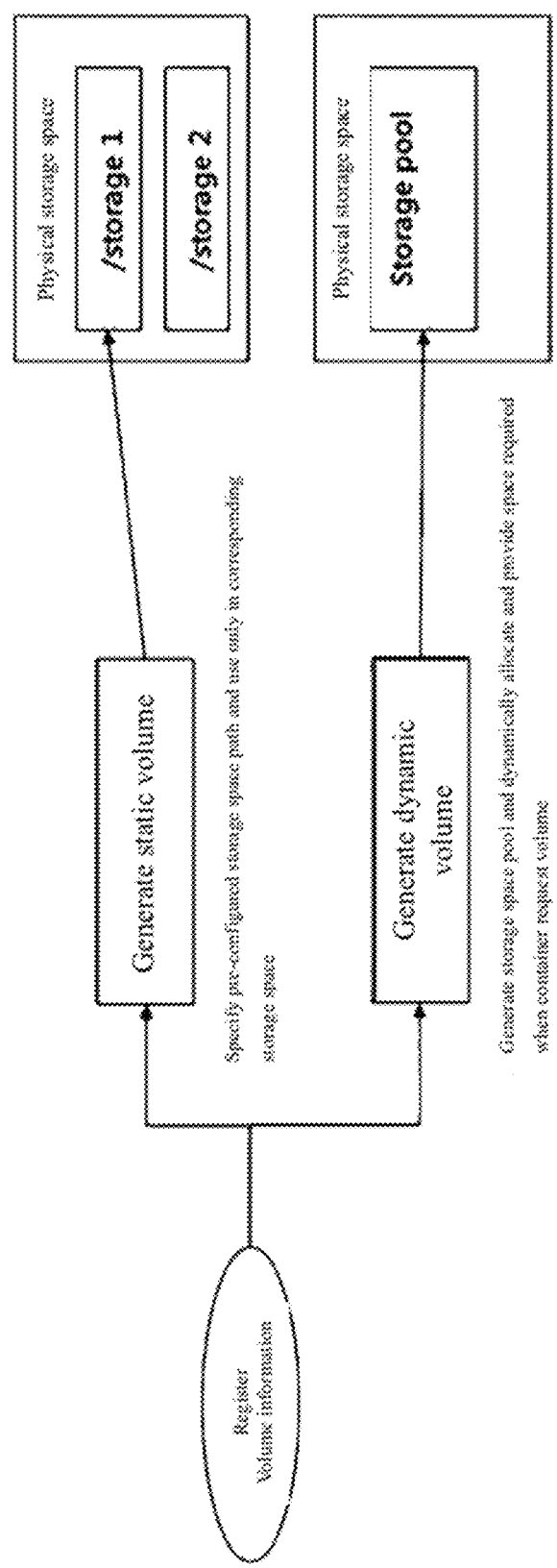
FIG. 15 is a diagram for describing volume information registration according to an embodiment of the present invention.

Volume information registration may be divided into static volume generation and dynamic volume generation, as illustrated in FIG. 15, and the static volume creation is to be used only in the storage space by specifying a pre-configured storage space path, and the dynamic volume generation is to generate a storage space pool and dynamically allocate and provide a space required when the container requests a volume.

Figure 16:
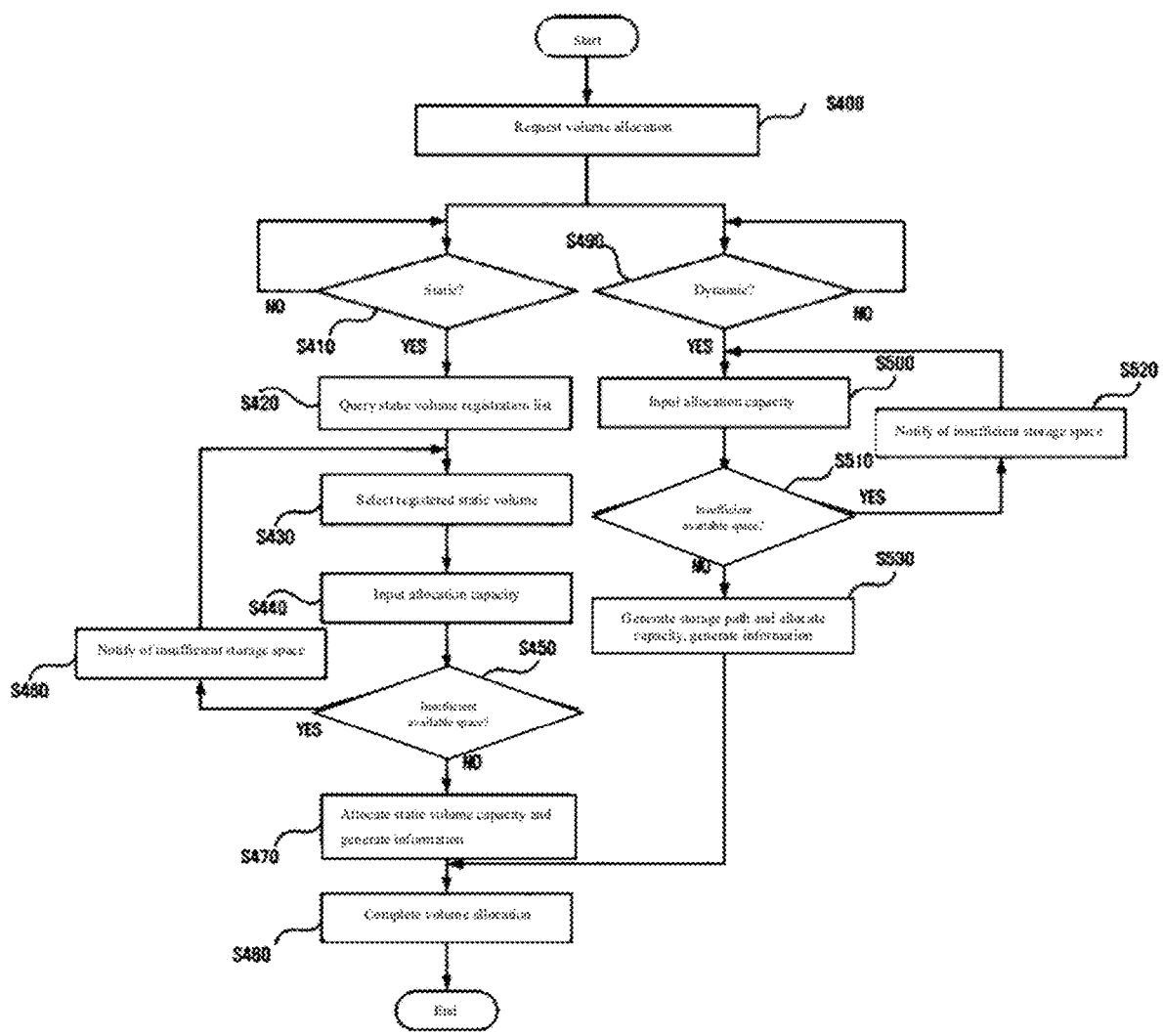
FIG. 16 is a flowchart illustrating a method for provisioning a container volume (storage) in a cloud platform system according to an embodiment of the present invention.

FIG. 16 is a flowchart illustrating a method for provisioning a container volume (storage) in a cloud platform system according to an embodiment of the present invention.

First, when a volume allocation is requested (S400), the cloud platform system determines whether to generate a static volume or a dynamic volume (S410 and S490).

If the static volume is generated, the cloud platform system queries a static volume registration list (S420). When the registered static volume is selected and a capacity allocation is requested (S430 and S440), the cloud platform system checks an available space (S450). If the available space is insufficient, the cloud platform system notifies that the storage space is insufficient (S460), and returns to step S430. On the other hand, if the available space is not insufficient, the cloud platform system allocates a static volume capacity and generates information to complete the volume allocation (S470 and S480).

When the dynamic volume is generated, the cloud platform system requests the capacity allocation and checks the available space (S500 and S510). If the available space is insufficient, the cloud platform system notifies that the storage space is insufficient (S520), and returns to step S500. On the other hand, if the available space is not insufficient, the cloud platform system generates a storage path and allocates a capacity allocation and information to complete the volume allocation (S470 and S480).

Figure 17:
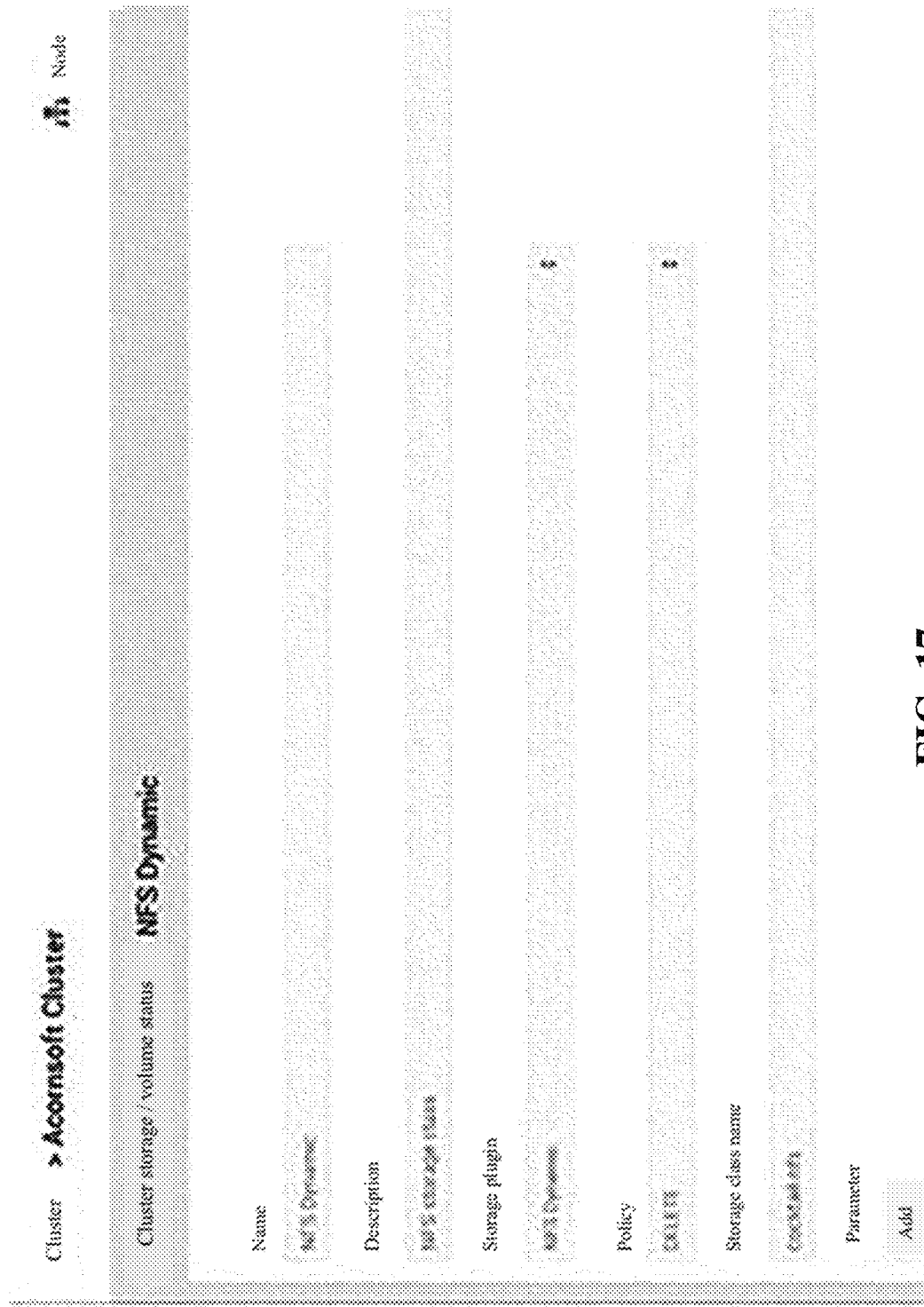
FIG. 17 is an exemplary diagram of a volume information registration screen according to an embodiment of the present invention.
Figure 18:
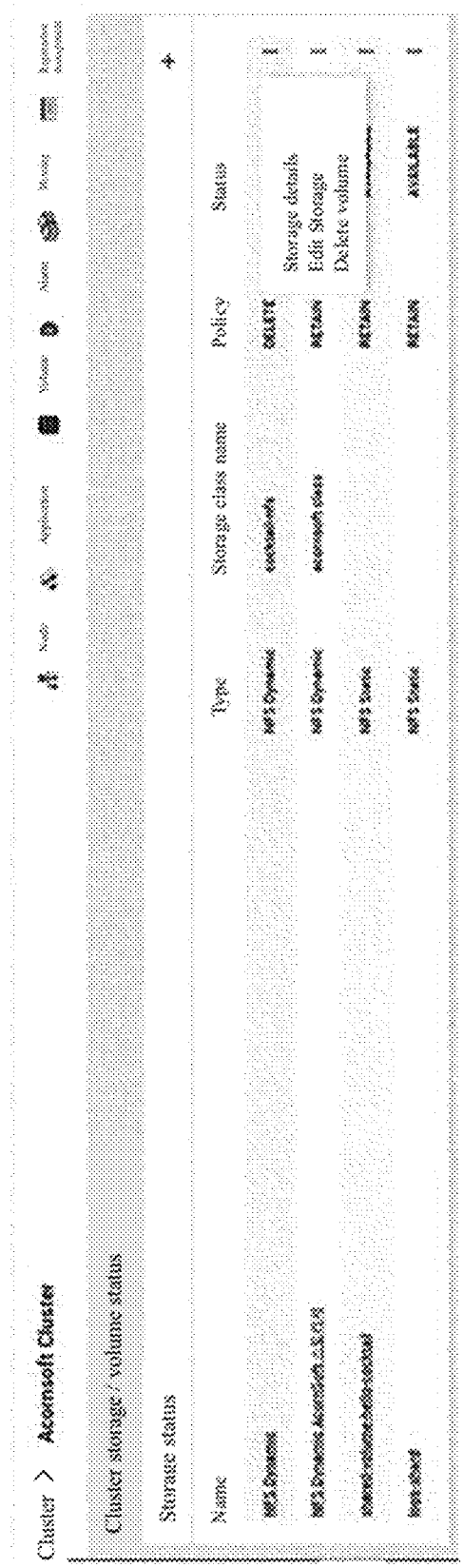
FIG. 18 is an exemplary diagram of a registered volume information status screen according to an embodiment of the present invention.

FIG. 17 is an exemplary diagram of a volume information registration screen according to an embodiment of the present invention and FIG. 18 is an exemplary diagram of a registered volume information status screen according to an embodiment of the present invention.

As illustrated in FIG. 17, volume usage information may be registered in the storage to generate volume information. The volume information registered in FIG. 17 may be checked in a registered volume information status of FIG. 18.

Figure 19:
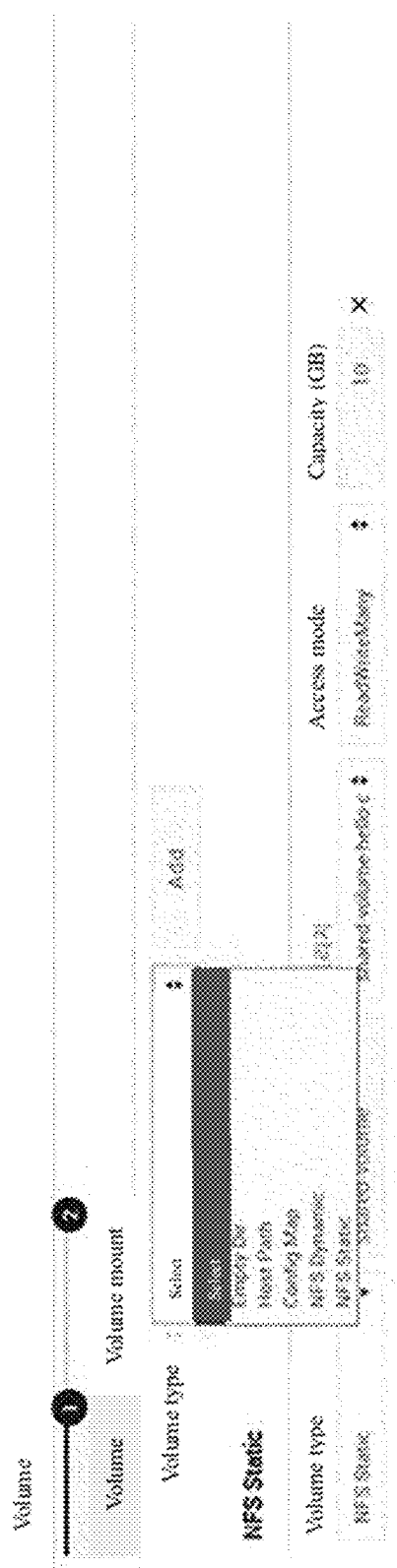
FIGS. 19 and 20 are exemplary diagrams of a screen for allocating a volume according to an embodiment of the present invention.
Figure 20:
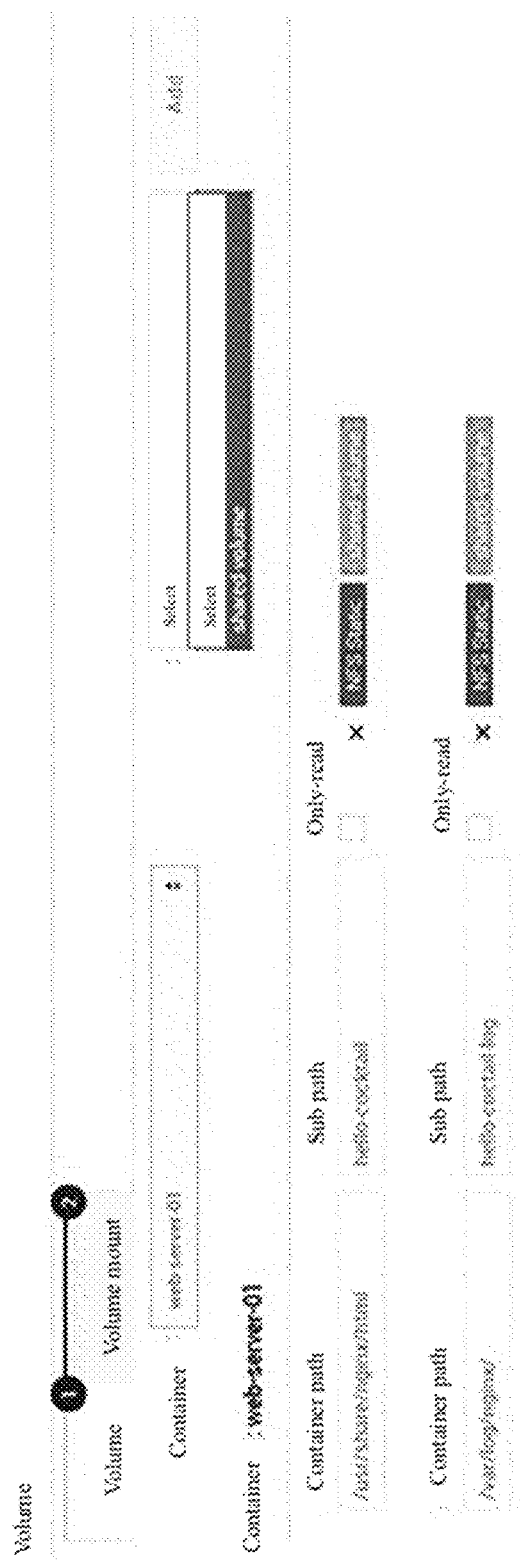

FIGS. 19 and 20 are exemplary diagrams of a screen for allocating a volume according to an embodiment of the present invention. FIG. 19 includes a volume type setting function of selecting pre-generated volume information and inputting a volume name, an access mode, and an allocation capacity, and FIG. 20 includes a volume mount function of mapping a path of the allocated volume and a path on the container.

Meanwhile, the embodiments of the present invention may be prepared by a computer executable program and implemented by a universal digital computer which operates the program by using a computer readable recording medium. The computer readable recording medium includes storage media such as magnetic storage media (e.g., a ROM, a floppy disk, a hard disk, and the like), optical reading media (e.g., a CD-ROM, a DVD, and the like), and a carrier wave (e.g., transmission through the Internet).

As described above, according to the method for containing an application in a cloud platform of the present invention, it is possible to provide an isolated application execution environment, independently assign resources, operate multiple applications on the same host and enabling a fast operation with OS-level virtualization, be efficient in deployment and updating to a small size of container image, and be movable anywhere.

In addition, the cloud platform system according to the present invention may allocate a storage space required for an application container by logically connecting an external storage space and a container.

The present disclosure has been described above with reference to preferred embodiments thereof. It is understood to those skilled in the art that the present disclosure may be implemented as a modified form without departing from an essential characteristic of the present disclosure. Therefore, the disclosed embodiments should be considered in an illustrative viewpoint rather than a restrictive viewpoint. The scope of the present disclosure is defined by the appended claims rather than by the foregoing description, and all differences within the scope of equivalents thereof should be construed as being included in the present disclosure.

The invention claimed is:

1. A method for provisioning an application container volume in a cloud platform, the method comprising the steps of:

determining, in response to a request for a volume allocation of an application container, whether a cloud platform system generates a static volume or a dynamic volume;
in response to determining that the cloud platform system generates the static volume and a first registered static volume is selected and a first allocation capacity is inputted,
  querying, by the cloud platform system, a static volume registration list,
  checking, by the cloud platform system, an available space from a storage space of the static volume,
    if the available space of the static volume is insufficient,
      notifying that the storage space of the static volume is insufficient,
      waiting for a second registered static volume to be re-selected and a second allocation capacity to be re-inputted; and
    if the available space of the static volume is sufficient,
      allocating a static volume capacity, and
      generating information to complete the volume allocation; and
in response to determining that the cloud platform system generates the dynamic volume, and a third allocation capacity is inputted,
  checking, by the cloud platform system, the available space of the dynamic volume,
    if the available space of the dynamic volume is insufficient,
      notifying that the storage space of the dynamic volume is insufficient,
      waiting for a fourth allocation capacity to be re-inputted; and
    if the available space of the dynamic volume is sufficient,
      generating a storage path,
      allocating a dynamic volume capacity, and
      generating information to complete the volume allocation.

\* \* \* \* \*